April 21, 1959

R. E. SPENCER ET AL 2,883,110

COMPUTING MECHANISM ESPECIALLY FOR CONTROLLING AUTOMATIC MACHINE TOOLS

Filed Oct. 25, 1956

Inventors
R. E. Spencer
R. Voles
By Glunck Downing Seebold
Attys.

April 21, 1959

R. E. SPENCER ET AL 2,883,110

COMPUTING MECHANISM ESPECIALLY FOR CONTROLLING
AUTOMATIC MACHINE TOOLS

Filed Oct. 25, 1956

Inventors
R. E. Spencer
R. Voles
By Clarence Downing Hubbell
Attys.

Inventors
R. E. Spencer
R. Voles

T INCREMENT.

United States Patent Office 2,883,110
Patented Apr. 21, 1959

2,883,110

COMPUTING MECHANISM ESPECIALLY FOR CONTROLLING AUTOMATIC MACHINE TOOLS

Rolf Edmund Spencer, West Ealing, London, and Roger Voles, Chiswick, London, England, assignors to Electric & Musical Industries Limited, Hayes, Middlesex, England, a company of Great Britain Application October 25, 1956, Serial No. 618,311

Claims priority, application Great Britain October 25, 1955

6 Claims. (Cl. 235—189)

This invention relates to automatic machine tools, especially though not exclusively those adapted for profiling turbine or impeller blades. In particular the invention is concerned with computing mechanism suitable for controlling machine tools.

A turbine or impeller blade has a complex shape which can only be simply interpreted in the same terms as those in which it is derived, which are the detailed cross-sections of the blade, normal to the length of the blade, taken at a number of stations along its length. The various cross-sections differ progressively in size, shape, and orientation. The changes in shape include both variations of the ratio of thickness to chord, and of the curvature or camber of the section. In particular cases it will be possible to define the cross-sections in terms of a basic law, containing a number of parameters which vary along the length of the blade. In such a case if it were proposed to profile the blade automatically by a machine having interpolation facilities such as described for example in co-pending United States application Serial No. 459,814 and United States application Serial No. 581,038 it would only be necessary to provide full interpolation around the basic section and interpolate each parameter along the blade length. In most cases, however, it is likely either that the variation of the sections will be too arbitrary to suit this method, or that there are so many parameters involved that there is no saving of interpolators.

Co-pending United States application Serial No. 618,310 filed by R. E. Spencer disclosed a preferred way of controlling a machine tool so as to cause it to generate a three dimensional profile, especially that of a turbine or impeller. However even with such control mechanism as disclosed in the last mentioned co-pending application, there remains the problem that the locus which has to be generated by the centre of the cutting tool differs from that to be described by the point of application of the tool on the work piece, the relationship between the two loci being by no means simple in the case of arbitrary three dimensional profiles. Moreover even if the machine is programmed with the locus to be described by the centre of a cutting tool of a chosen size, difficulty can still arise because the actual tool size may differ significantly from its normal size, due for example to the tool having been reground.

The principal object of the present invention is to provide improved control mechanism for a machine tool and which, in deriving control signals, automatically takes account of dimensions of the cutter.

According to the present invention there is provided a computing mechanism suitable for generating signals for controlling displacement of one part relative to another, comprising a source of signals representing three co-ordinates of a point which describes a locus on a three dimensional surface, means for deriving the direction ratios of the normal to the surface of said point, and manually presettable means responsive to said signals and said direction ratios for deriving control signals representing three coordinates of another point which describes the locus of a centre of a rolling body having a point of contact with said surface which constitutes said first mentioned point.

In order that the invention may be clearly understood and readily carried into effect, the invention will be described with reference to the accompanying drawings, in which.

Figure 1:
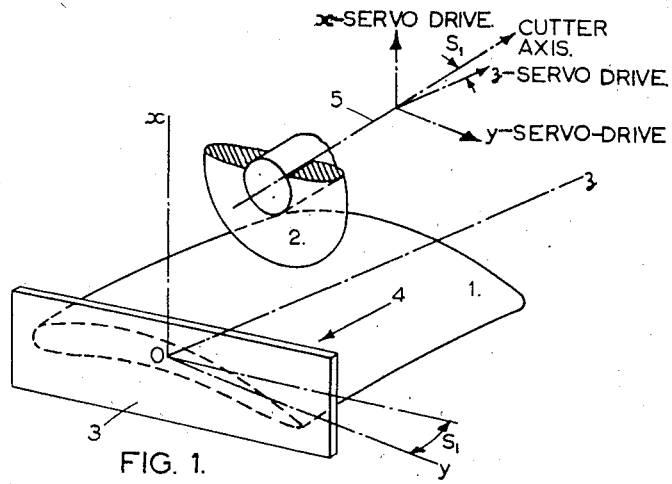
Figure 1 is a functional diagram which depicts the mode of operation of a machine tool fitted with control mechanism to be described.
Figure 2:
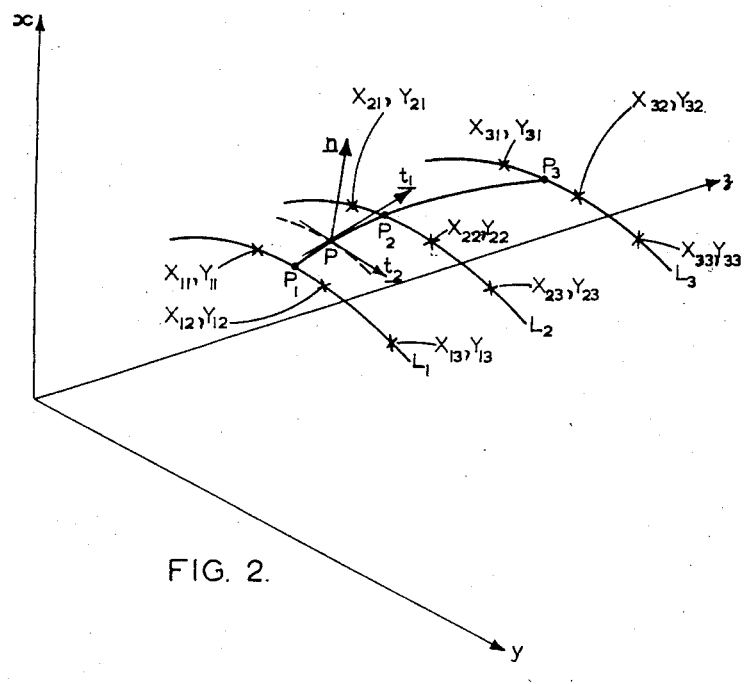
Figures 2, 3a, 3b and 4 are further diagrams explanatory of the operation of the control mechanism to be described.

Referring to the drawing the control mechanism to be described is intended for an automatic machine tool, the tool holder or work table (and say the work table) of which is capable of independent displacement by servo-means in three mutually perpendicular directions, which may be taken as defining a right handed system of axes $(x, y, z)$ represented in Figure 1. To illustrate the operation of the control mechanism, it will be assumed that a turbine or impeller blade such as denoted by the reference 1 has to be profiled with the aid of a milling cutter 2 (shown also in Figure 3) which has a convex cutting face $2a$. The blade has a root 3 and the origin of the system of axes $(x, y, z)$ is taken in the root surface 4. For the sake of generality it will be assumed that the root surface 4 is tilted out of the $xy$ plane by a rotation $S_1$ (Figures 1 and 4) about the $x$ axis, and to facilitate machining the cutter axis 5 is tilted by the same rotation out of the $xy$ plane. The turbine blade to be profiled is defined by three cross sections $L_1$, $L_2$ and $L_3$ (Figure 2) normal to and spaced along the length of the blade, defined by the $z$ axis. The input signals to the control mechanism represent the $x$ and $y$ co-ordinates of a few reference points on the profile, such as indicated in Figure 4 by $(x_{11}, y_{11})$, $(x_{12}, y_{12})$ and so on, at each of the three $z$ stations determined by the sections $L_1$, $L_2$ and $L_3$. Such input signals are derived from reading means which senses in known manner a tape or card in which the dimensions are recorded in a suitable code, for example a binary-decimal code, by means of punched holes. Magnetic cards may of course also be used. The reference points are chosen to include critical points, such as leading and trailing-edges, but reference points need only be relatively widely spaced round the sections, as the control mechanism, as will appear, incorporates quadratic interpolating means for deriving from the input signals, after their conversion to analogue form, other signals representing the $x$ and $y$ co-ordinates of more closely spaced points on the respective sections. A representative point on the section $L_1$ whose co-ordinates are derived by interpolation is denoted in Figure 2 by the reference $P_1$, and the references $P_2$ and $P_3$ denote corresponding points on the sections $L_2$ and $L_3$. The control mechanism further incorporates quadratic interpolation means to derive analogue signals reresenting the $x$ and $y$ co-ordinates of the general point P by interpolating within the points $P_1$, $P_2$ and $P_3$, this interpolation being dependent upon the z displacement of the table. In order to maintain a roughly parabolic curve for this z interpolation, similar types of points $P_1$, $P_2$ and $P_3$ must be used simultaneously in the three sections and to allow this, the interpolation of the x and y co-ordinate of the points such as $P_1$, $P_2$ and $P_3$ is effected in dependence upon a common non-geometric parameter T. The theory of such interpolation is described in detail in United States application Serial No. 581,038.

Figure 3:
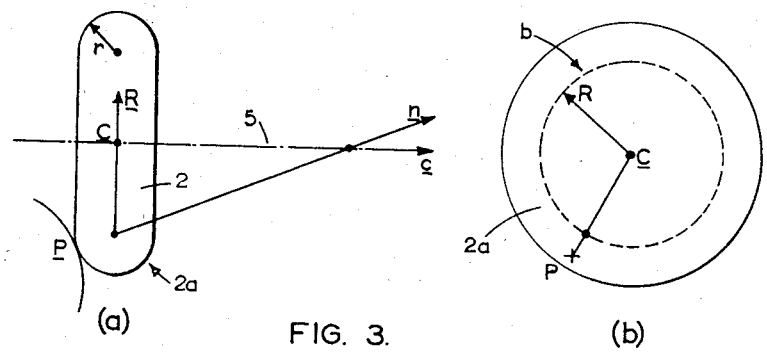
Figure 4:
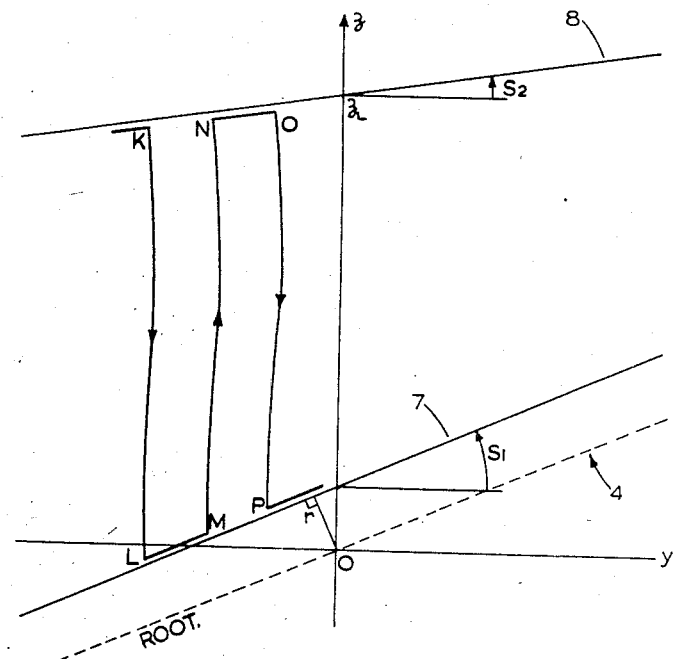

The command signals $x_0$ and $y_0$ for displacing the work table in the x and y directions as produced by the control mechanism take account, however, of the non-zero size of the cutter 2, so that the locus defined by the command signals is that which is described by the cutter centre c shown in Figure 3. The cutter size is also taken into account in a signal $z_0$ responsive to the displacement in the z direction, which signal is used in the sequence controller. The cutter size is defined by two radii R and r, where r is the radius of the convex face of the cutter, and R is the radius from the centre c to the locus of the centre of the convex face, denoted by the dotted line b in Figure 3(b). Therefore at any instant the position of the cutter centre c with reference to the origin o is given by a vector C where $$C = P + rn + RR$$

In this relationship the vector n is a unit vector normal to the surface to be machined at the point P, while R is a unit vector directed to the centre c of the cutter from the intersection of the vector n with the locus b.

As will appear, this vector equation is solved by the control mechanism which is arranged to control the cutter in such a way that it recipricates along the blade length and advances by small increments round the sections at the end of each lengthwise traverse, as indicated by the track KLMNOP . . . in Figure 4. The limit of the lengthwise traverse near the root is specified by a plane 7 parallel with the root surface 4 and spaced therefrom by distance r. Similarly the limit of lengthwise traverse at the end opposite to the root is specified by a plane turned out of parallelism to the xy plane by a rotation $S_2$ about the x axis and intersecting the z axis at $z_L$.

The foregoing preamble indicated generally the construction and operation of the machine which is controlled by the mechanism according to the invention, and the machine itself will not be further described. Indeed in some cases the command signals generated by the control mechanism may be recorded before being employed for control purposes. All analogue signals in the control mechanism are alternating voltages. Before proceeding with the description of the control mechanism the theoretical basis for its operation will be given.

The solution of the foregoing equation specifying the locus of the cutter centre is obtained by noting that the cutter and the blade share the same tangent plane at P.

The tangents to the blade surface at P along $P_1$, $P_2$, $P_3$ and parallel to the xy plane will be denoted by $t_1$ and $t_2$, respectively, and the normal, having direction cosines $(l_n, m_n, n_n)$ by n. Differentials of the surface in sections parallel to the xy plane will be distinguished by primes. Thus, the direction ratios of $t_2$ and $t_1$ are respectively, $$\left[\frac{dx'}{dT}, \frac{dy'}{dT}, 0\right]$$

and $$\left[\frac{dx}{dz}, \frac{dy}{dz}, 1\right]$$

while n fulfils $$\left.\begin{array}{l} l_n \dfrac{dx'}{dT} + m_n \dfrac{dy'}{dT} = 0 \\[4pt] l_n \dfrac{dx}{dz} + m_n \dfrac{dy}{dz} + n_n = 0 \end{array}\right\} \quad (1)$$

and simultaneously. The values of $$\frac{dx'}{dT}$$

and $$\frac{dy'}{dT}$$

can be obtained by interpolation within $$\frac{dx_1'}{dT}, \frac{dx_2'}{dT}, \frac{dx_3'}{dT}$$

and $$\frac{dy_1'}{dT}, \frac{dy_2'}{dT}, \frac{dy_3'}{dT}$$

respectively, which are evaluated by the control mechanism. The differentials $$\frac{dx}{dz}, \frac{dy}{dz}$$

are obtained similarly. The Equations 1 may be put into a form suitable for solution by servos by expressing $(l_n, m_n, n_n)$ in terms of two polar angles $\theta_1$, $\phi_1$:

$$\left.\begin{array}{l} l_n = \sin\theta_1 \cos\phi_1 \\ m_n = \sin\theta_1 \sin\phi_1 \\ n_n = \cos\theta_1 \end{array}\right\} \quad (2)$$

The Equations 1 then become:

$$\left.\begin{array}{l} \dfrac{dx'}{dT}\cos\phi_1 + \dfrac{dy'}{dT}\sin\phi_1 = 0 \\[4pt] \dfrac{dx}{dz}\sin\theta_1\cos\phi_1 + \dfrac{dy}{dz}\sin\theta_1\sin\phi_1 + \cos\theta_1 = 0 \end{array}\right\} \quad (3)$$

In the control mechanism three magslip resolvers and two servo systems are provided to solve the Equations 3.

From Figure 3 it is apparent that n intersects the unit vector c along the tool axis. The position of the centre of the cutter is given as aforesaid by the vector relationship.

$$C = P + rn + RR$$

where $$\left.\begin{array}{l} R.c = 0 \\ R.(n \times c) = 0 \end{array}\right\} \quad (4)$$

and

In the Equations 4, a dot "." denotes a scalar product and a cross "×" denotes a vector product. Let the direction cosines of R and c be, respectively $$(l_R, m_R, n_R) \text{ and } (l_c, m_c, n_c)$$

with $$\left.\begin{array}{l} l_R = \cos\theta_2 \\ m_R = \sin\theta_2 \cos\phi_2 \\ n_R = \sin\theta_2 \sin\phi_2 \end{array}\right\} \quad (5)$$

and, when the cutter is tilted, $$\left.\begin{array}{l} l_c = 0 \\ m_c = -\sin S_1 \\ n_c = \cos S_1 \end{array}\right\} \quad (6)$$

Substitution then reduces the first of Equations 4 to $$-\cos\phi_2 \sin S_1 + \sin\phi_2 \cos S_1 = 0$$

whence $$\phi_2 = S_1 \quad (7)$$

Insertion of this result into the second of Equations 4 yields $$(m_n \cos S_1 + n_n \sin S_1)\cos\theta_2 - l_n \sin\theta_2 = 0 \quad (8)$$

and this equation is solved for $\theta_2$ with two attenuators and one resolver since $l_n$, $m_n$, $n_n$ come from the solution of Equations 3. The two attenuators and the angle $-S_1$ can be set manually.

Figure 5A:
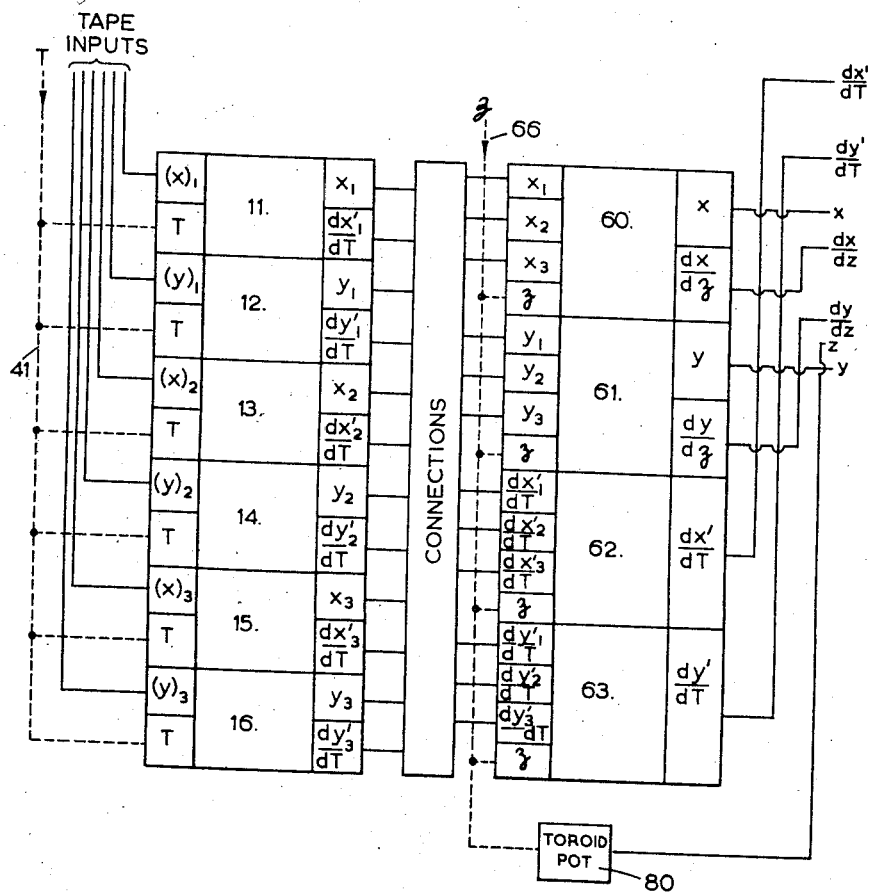
Figures 5a and 5b are general diagrammatic views of the control mechanism to be described, which are preferred examples of control mechanism according to the invention, and which are adapted for use in conjunction with a sequence controller.
Figure 5B:
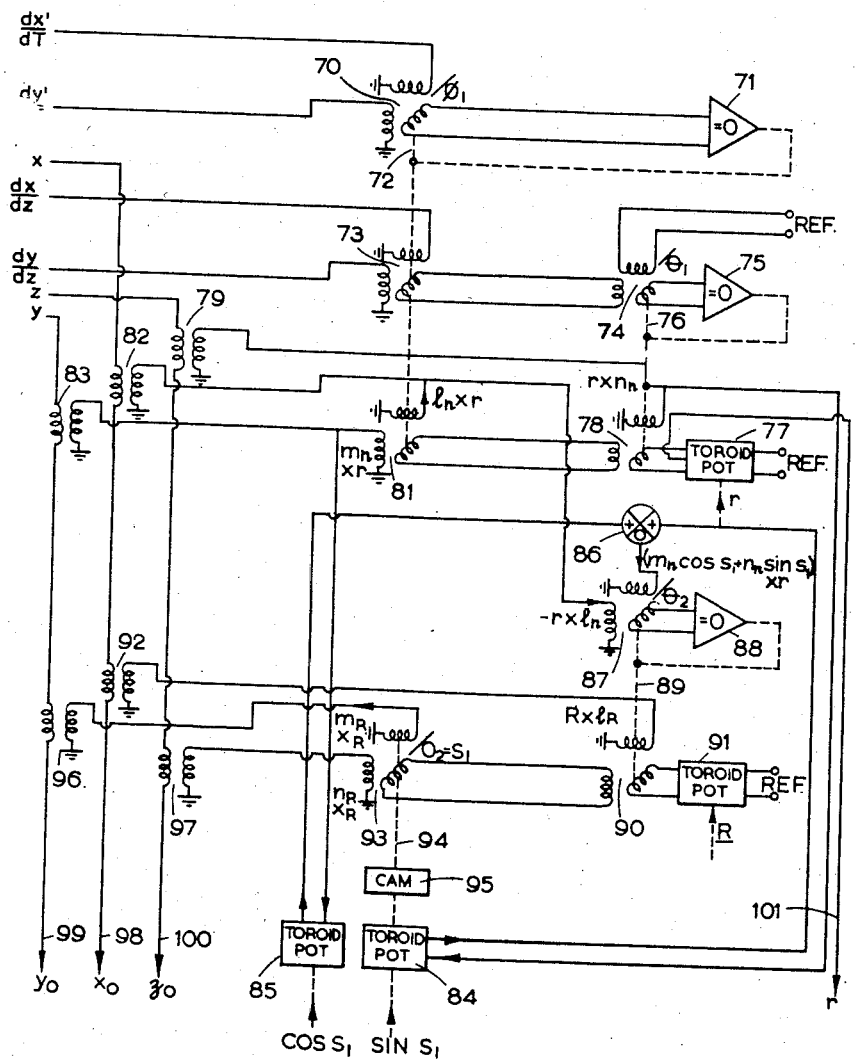

In order to simplify the illustration of the control mechanism, electrical connections in Figure 5 have been shown in full lines and mechanical connections have been indicated by dotted lines. The control mechanism comprises six units denoted by references 11 to 16. These accept input signals from the record reading means and derive, in dependence upon the parameter T, the $x$ and $y$ co-ordinates of successive closely spaced points on each of the sections $L_1$, $L_2$ and $L_3$, the points $P_1$, $P_2$ and $P_3$ being as aforesaid representative. The unit 11 accepts input signals denoted generally by $(x)_1$ representing the $x$ co-ordinates of reference points on the section $L_1$, the unit 12 accepts input signals $(y)_1$ representing $y$ co-ordinates of the same reference points on the section $L_1$, and similarly for the units 13, 14 and 15, 16 as indicated in the drawing. The construction of the units 11 to 16 is illustrated in a greater detail in Figure 6, which shows by way of example the unit 11.

Figure 6:
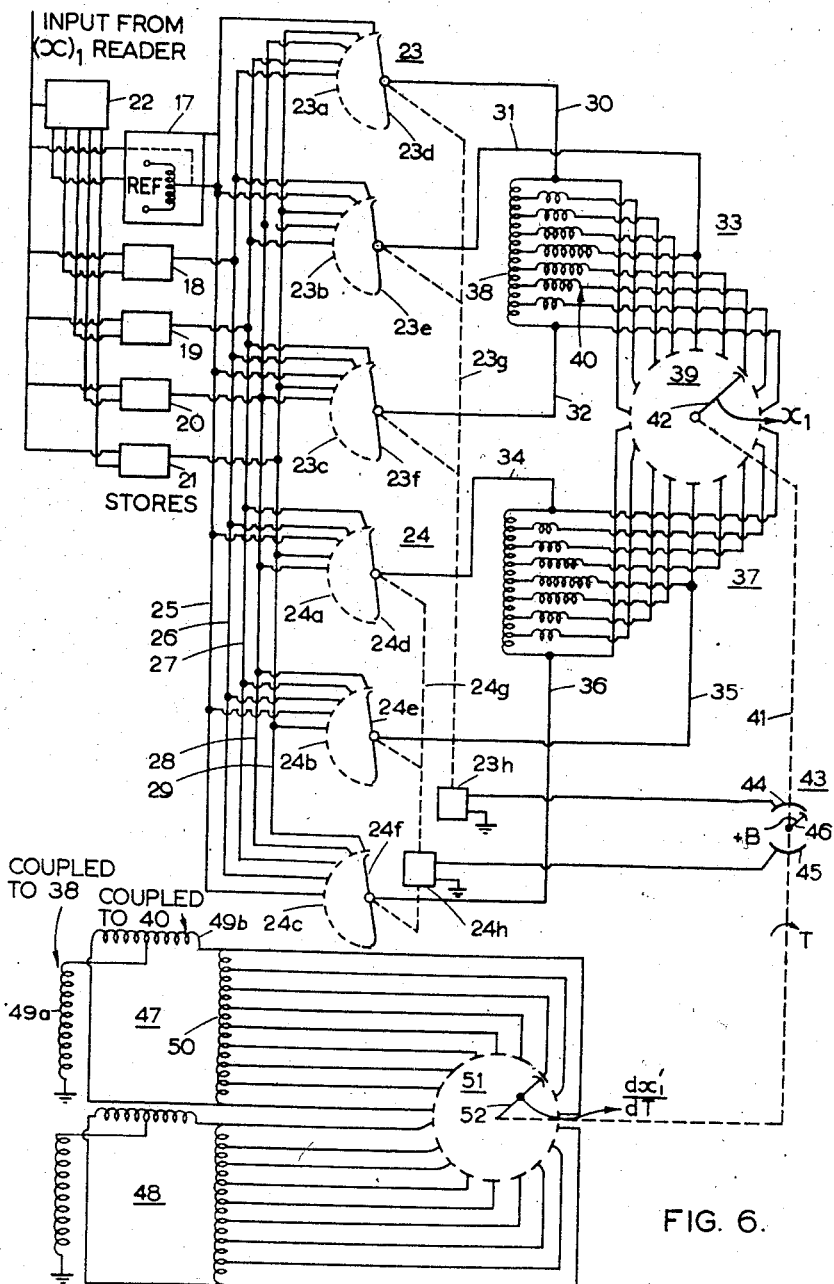
Figures 6 and 7 are detail views of parts which are shown in block form in Figure 5.

The reading means may be of known construction and it will be assumed, in describing Figure 6, that signals representing the $x$ co-ordinates of reference points on the section $L_1$ are derived serially from the record, although it is also feasible to derive groups of such signals simultaneously. The signals representing the $y$ co-ordinates of the reference points in the same section, and the signals representing the co-ordinates of the reference points in the other sections are derived in the same rhythm, as the units 11 to 16 all respond to the parameter T in the same way. The signals representing the co-ordinates of the reference points are derived in a digital code form, and each signal representing an $x$ co-ordinate of a reference point in the section $L_1$ is applied in parallel to five stores 17 to 21. The stores are controlled by the programme unit 22 which applies conditioning signals to the stores in a cyclic order, and the stores remain unresponsive to an applied signal unless conditioned by a conditioning signal. For example, if the store 17 is caused to respond to the co-ordinate $x_{11}$, the stores 18 to 21 are then caused to respond to the co-ordinates $x_{12}$ to $x_{15}$ respectively. This completes one storage cycle and the co-ordinate $x_{16}$ is then accepted by the store 17. While the construction of the programme unit 22 and the stores 17 to 21 do not form part of the present invention, a suitable construction is described in co-pending United States application Serial Number 518,912 and it is sufficient for the purposes of the present application to regard each of the stores, as represented in the case of the store 17, as an alternating current potentiometer, the tap of which is adjusted by the signal derived from the reading means so the voltage amplitude at the tap is the required analogue. It will be apparent that with a store of this type, adjustment of the tap in response to a subsequent signal automatically "clears" old information from the store. The analogues set up by the stores 17 to 21 are applied to five bus-bars which are connected in a predetermined order, which is apparent in the drawing, to the studs of two uni-selectors or stepping switches 23 and 24 each having three banks of contacts. The contact banks of the uniselector 23 are denoted by the references 23a and 23b and 23c and the respective wipers are denoted by the references 23d, 23e and 23f. It will be understood that the wipers are mounted on a common shaft represented by the dotted line 23g which is driven by stepping mechanism in such a way that the wipers are rotated step by step from one contact-engaging position to another in response to the application of successive impulses to the stepping mechanism. The stepping mechanism for uniselector 23 is represented merely by the block 23h since the construction of uniselectors is well known. Similarly the uniselector 24 has three contact banks 24a, 24b and 24c and corresponding wipers 24d, 24e and 24f mounted on a common shaft, represented by the dotted line 24g, which can be rotated step by step by stepping mechanism 24h. The number of contact studs on each bank of the uniselectors 23 and 24 may be any multiple of five, and ten studs are shown on each bank. The bus-bars to which the studs are connected are denoted by the references 25 to 29 respectively. To simplify the drawing connections are shown to only five studs of each contact bank and it will be understood that the connection to the other five studs of each bank are the same as for the five which are shown. The electrical output signals from the wipers of the uniselector 23 are applied by leads 30, 31 and 32 to the input points of a quadratic interpolator 33. Similarly the electrical output signals from the wipers of the uniselector 24 are applied by leads 34, 35 and 36 to the three input points of a quadratic interpolator 37. The interpolator 33 comprises an autotransformer 38, eleven regularly spaced points on which are connected to the studs on the upper half of a stud circle 39. The connections form the points on the auto-transformer 38 to the stud circle 39 selectively include a series of windings denoted in general by 40 which are inductively coupled to each other but not to the winding 38. The windings 40 are termed parabolic windings and have numbers of turns which are related to each other in accordance with a quadratic law so that as described in co-pending United States application Serial Number 459,814 the amplitudes of the electro-motive forces induced at the respective studs in the circle 39 represent that the $x$ co-ordinates of closely spaced points on a quadratic curve determined by the input signals. The co-ordinate values represented by the input signals are determined in dependence upon selected value of the parameter T, and instantaneous value of this parameter is represented by the angular displacement of shaft 41 which is common to all the units 11 to 16 and which is controlled in a manner to be described with reference to Figure 8. The interpolator 37 is of the same construction as the interpolator 35 but its output studs comprise the lower half of the stud circle 39. The value of the $x$ co-ordinate of the point (say $P_1$) on the section $L_1$ corresponding to the instantaneous value of T is derived by means of a contact brush 42 mounted in the shaft 41 so that when the shaft is rotated to correspond to variation of T the brush moves from one stud to the next. Brush 42 is of a make-before-break type so that there is no interruption in the output signal picked up by the brush 42. This output signal is an alternating voltage with an amplitude corresponding to the $x$ co-ordinate of $P_1$, denoted herein by $x_1$. In fact with the simple arrangement there will be small steps in the output voltage but in practice these steps are reduced by linear sub-interpolation as described for example in co-pending United States patent application Serial 459,814.

The stepping operation of the uniselectors 23 and 24 is controlled by the shaft 41 by means of a switch 43 which has two contacts 44 and 45 and a brush 46 mounted on the shaft 41. The brush 46 is connected to a suitable source of potential and the contacts 44 and 45 are connected respectively to the stepping mechanisms 23h and 24h of the uniselectors. Evidently, the switch 43 causes a pulse to be applied to each uniselector once per revolution of the shaft 41 and the timing of these pulses is arranged to be such that the uniselector 24 is advanced by one step when the brush is deriving an output from the interpolator 33. Similarly the uniselector 23 is advanced by one step when the brush 42 is deriving the output from the interpolator 37. Furthermore it is apparent from the connections from the stores 17 to 21 to the uniselectors 23 and 24 that, as the uniselectors are advanced step by step, the $x$ co-ordinates of successive reference points are applied in appropriate sequence, and alternately, to the interpolators to produce virtually continuous interpolation round the section $L_1$, as a function of the parameter T.

The unit shown in Figure 6 also derives an alternating current signal having an amplitude representing $$\frac{dx'}{dT}$$

at the point on the section $L_1$ corresponding to the instantaneous value of the parameter T. This is achieved by means of two differentiating devices 47 and 48 coupled respectively to the interpolators 33 and 37. For example, the differentiating device 47 comprises an inductance 49a coupled to the autotransformers 38 and another inductance 49b coupled to the transformer 40. One end of the inductance 49a is grounded and the other end is connected to the mid-point of the inductance 49b. The ends of the inductance 49b are in turn connected to the ends of a linearly tapped autotransformer 50, the tappings on which are connected to the studs in the upper half of a stud circle 51, similar to the stud circle 39. The differentiating device 48 has a similar construction but its output taps are connected to the studs in the lower half of the stud circle 51. The stud circle 51 is scanned by a brush 52 carried by the shaft 41 in the same angular position as the brush 42 and it can be shown that by suitably proportioning the inductances 48 and 49 the voltage pick up by the brush 52 has an amplitude analogous to $$\frac{dx'}{dT}$$

at point $P_1$. This amplitude is hereinafter denoted as $$\frac{dx'}{dT}$$

As aforesaid the other units 12 to 16 are similar to the units 11 and the output analogue signals which they generate are denoted at the right hand sides of the respective rectangles, the respective input information being indicated at the left hand sides.

Figure 7:
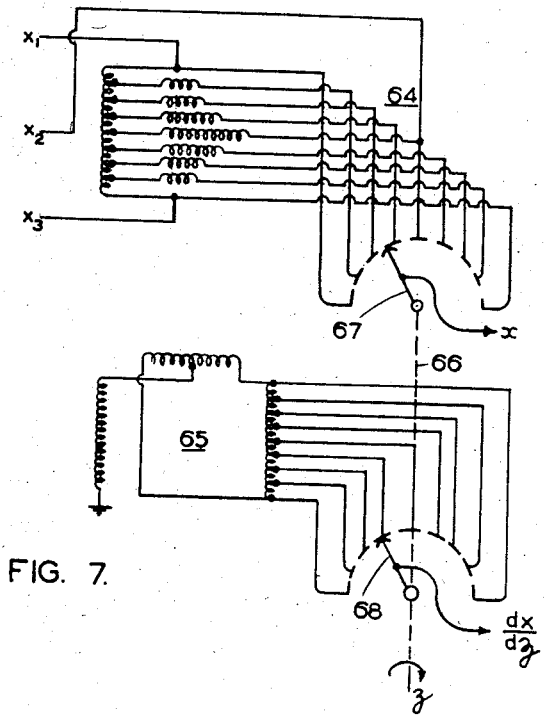

The various output signals from the units 11 to 16 are applied in selected groups as indicated in Figure 5 to four additional interpolating units 60, 61, 62 and 63. To illustrate the construction of such units, the unit 60 is shown, by way of example, in Figure 7. It comprises a single quadratic interpolator 64, similar to the interpolator 33, and a single differentiating device 65. No duplicate interpolators and differentiating devices are shown in the unit 60, because the variation of $z$, which is the independent variable in this case, is confined to a single span within the sections $L_1$ and $L_3$, in the profile being discussed. Obviously however the interpolator 64 and differentiating device 65 may be duplicated if there are more than three sections. The value of $z$ is represented by the angular displacement of a shaft 66, which is controlled in a manner to be explained with reference to Figure 8, and a signal representing the $x$ co-ordinate of the point of the profile determined by the instantaneous values of the parameter T and the co-ordinate $z$ is picked up by a brush 67 mounted on the shaft 66. This signal is again an alternating voltage whose amplitude is the desired analogue, and may be assumed to represent the $x$ co-ordinate of the general point P. Similarly, by virtue of the brush 68, the voltage is derived from the device 65 representing, by its amplitude $$\frac{dx}{dz}$$

at the point P. The unit 61 is the same construction as 60, and generates alternating voltages with amplitudes representing $y$ and $$\frac{dy}{dz}$$

at point P. The units 62 and 63 are similar to 60 and 61, without the differentiating devices, and they derive, by quadratic interpolation alternating voltages with amplitudes representing $$\frac{dx'}{dT}$$

and $$\frac{dy'}{dT}$$

respectively at point P. The shaft 66, whose angular displacements represent the value of $z$, is common to all the units 60 to 63.

In all the units 11 to 16 and 60 to 63 means may be provided for producing linear sub-interpolation, as described in United States application Serial No. 459,814 of the signals set up at studs of the quadratic interpolators and differentiating devices. In this case the displacement of the relatively high speed shafts of the sub-interpolating means may be used to represent the variables T and $z$ and the relatively slow speed shafts 41 and 66 may be driven, continuously or step-by-step, by the high speed shafts.

The apparatus as so far described generates the co-ordinates of the general point P on the profile to be cut, in other words it generates the components of the vector P. The structure for generating the components of the vector P constitutes the subject matter of the aforesaid co-pending application Serial No. 618,310 and is no part of the present invention. The other parts of the apparatus shown in Figure 5 are concerned with the vector additions required to generate the locus of the cutter centre $c$.

Thus, reference 70 denotes a magslip resolver, to the stator windings of which are applied the signals analogous to $$\frac{dx'}{dT}$$

and $$\frac{dy'}{dT}$$

from units 62 and 63. The angular position of the rotor is controlled in known manner by an electro-mechanical servo, represented sybolically by the triangle 71, included in known manner in a feed-back loop. The servo-loop tends to rotate the rotor to minimise amplitude variations of the signal picked up by the rotor, and on this condition the rotor shaft 72 assumes the angular displacement $\phi_1$ thereby solving the first of Equations 3 above. The rotor winding of another resolver 73 is mounted on the shaft 72 and the signals analogous to $$\frac{dx}{dz}$$

and $$\frac{dy}{dz}$$

are applied as shown to the stator windings of this resolver. Consequently the voltage induced across the rotor windings represents $$\frac{dx}{dz}\cos\phi_1 + \frac{dy}{dz}\sin\phi_1$$

and this is applied across one stator winding of a third resolver 74. The other stator winding of this resolver 74 is energised by voltage of reference amplitude, representing unity on the scale of the mechanism. The angular displacement of the rotor of the resolver 74 is controlled by an electro-mechanical servo-loop 75 which tends to reduce the output of the rotor winding to zero. On this condition, the rotor shaft assumes an angular displacement $\theta_1$ given by the second of the Equations 3:

$$\left(\frac{dx}{dz}\cos\phi_1 + \frac{dy}{dz}\sin\phi_1\right)\sin\theta_1 + \cos\theta_1 = 0$$

A voltage representing the dimension $r$ of the cutter 2 is set up by means of potentiometer 77 wound on a toroidal core, the potentiometer being manually preset and energised by an alternating voltage of reference amplitude. The voltage output of the potentiometer is applied across the rotor winding of a resolver 78, the rotor winding of which is mounted on the shaft 76. Since cos $\theta_1$ is equal to $n_n$ a voltage representing $r \times n_n$ is set up across one stator winding of the resolver 78 and this is added by a transformer 79 to an alternating voltage of amplitude representing $z$. This latter voltage is derived from a potentiometer 80 wound on a toroidal core, the tap of which is set by the shaft 66. The transformer 79 therefore adds to z, a signal representing the component, parallel to the z-axis, of the vector rn.

The voltage set up across the other stator winding of the resolver 78 represents $r \sin \theta_1$ and this voltage is applied to the rotor winding of a further resolver 81. The rotor of this further resolver is mounted on the shaft 72, which registers the angle $\phi_1$. Therefore the voltages set up across the stator windings of the resolver 81 are, respectively, $r \sin \theta_1 \cos \phi_1$ and $r \sin \theta_1 \sin \phi_1$, namely the components $r \times l_n$ and $r \times m_n$, of the vector rn. The first of these components is added, by a transformer 82 to the voltage representing $x$, whereas the second component is added by a transformer 83 to the voltage representing $y$.

The voltage $r \times n_n$ that is $r \cos \theta_1$, derived from one stator winding of the resolver 78, is applied not only to the transformer 79, but as the reference voltage to a toroidal-core potentiometer 84. The tap of the potentiometer is set manually to represent $\sin S_1$, so that the voltage derived from the tap represents $rn_n \sin S_1$. Reference 85 denotes a similar potentiometer, the reference voltage for which is derived from resolver 81 and represents $r \times m_n$, that is $r \sin \theta_1 \sin \phi_1$. The tap on the potentiometer 85 is set manually to represent $\cos S_1$, so that the voltage derived from the tap represents $rm_n \cos S_1$. The voltages derived from the potentiometers are added by a device, denoted symbolically at 86 and which may be of any suitable construction, and the resultant is applied to one stator winding of a resolver 87. The other stator winding of the resolver 87 receives a voltage representing $-r \times l_n$ from the resolver 81. The rotor winding of the resolver 87 is included in the feedback of an electro-mechanical servo 88, so that the servo tends to solve the Equation 8 for $\theta_2$, the solution being registered by the angular displacement of the rotor shaft 89. The rotor winding of a further resolver 90 is mounted on a shaft 89 and the voltage applied to this rotor winding is derived from potentiometer 91 energised by a reference alternating voltage and manually set so that the voltage derived from it represents R. The respective stator windings of the resolver 90 therefore pick up signals representing $R \cos \theta_2$ and $R \sin \theta_2$. The first of these voltages represents $R \times l_R$, that is the component parallel to the $x$ axis of the vector RR, and it is added by means of a transformer 92 to the voltage representing $x$ derived from the unit 60. The voltage $R \sin \theta_2$ derived from the other stator winding of resolver 90 is applied to the rotor winding of yet another resolver 93. The angular displacement of this rotor is set manually to represent the angle $\phi_2$, which is equal to $S_1$. This can be achieved for example by mounting the rotor of 93 on a shaft 94 driven by means of a cam 95 from the tap of the potentiometer 84. The stator winding of the resolver 93 therefore derives voltages representing respectively $R \sin \theta_2 \cos \phi_2$ and $R \sin \theta_2 \sin \phi_2$. These two voltages are equivalent to $R \times m_R$ and $R \times n_R$, so that they are analogous to the components parallel to the $y$ and $z$ axes of the vector RR. These vector components are now added to the voltages representing $y$ and $z$ derived from the unit 61 and the potentiometer 80, by means of transformers 96 and 97.

Therefore, the resultant signals accumulated on the output leads 98, 99 and 100 of the mechanism shown in Figure 5 are analogous to the component, parallel to the $x$, $y$ and $z$ axes, of the vector C. These signals are represented in the drawings $x_0$, $y_0$ and $z_0$. The signals $x_0$, $y_0$ are the command signals for the machine, whilst the signal $z_0$ is used as a feedback signal in the sequence controller illustrated in Figure 8. An electrical analogue signal representing $r$ is derived by a lead 101 from the potentiometer 77 and this is also used in the sequence controller.

The toroidal-core potentiometers shown symbolically in Figure 5 may comprise several stages of voltage subdivision, as described for example in United States application Serial No. 484,202 in order to achieve a high accuracy. Moreover, the magslip resolvers shown may be replaced by sine and cosine potentiometers, of the construction described for example in British Patent No. 740,071. If resolvers are used, an error $e$ in the shaft position of one of the servo resolvers, referred to a plane section of the cutter containing a radius of curvature $f$, results in a cutting error of $$\frac{fe^2}{2}$$

Since $R > r$, the servo which solves Equation 8 has to have the highest accuracy, which for $R = 2''$ and a cutting error of 0.001'' is in the order of 2°.

As shown in Figure 5, the solution of Equation 8 is performed by two preset toroidal-core potentiometers, a cam and a servo resolver. It is unlikely that the use of a cam will present any difficulties but, should it do so, $\phi_2$ could be obtained by a further servo resolver or by setting-in $S_1$ manually.

Figure 8A:
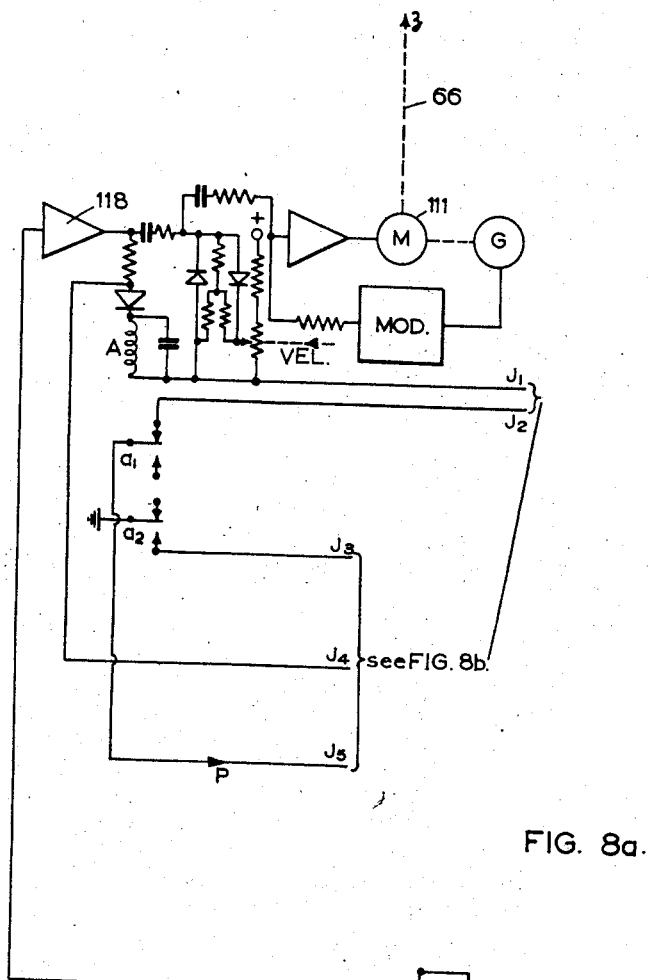
Figures 8a and 8b are general diagrammatic views of the sequence controller referred to above.
Figure 8A:
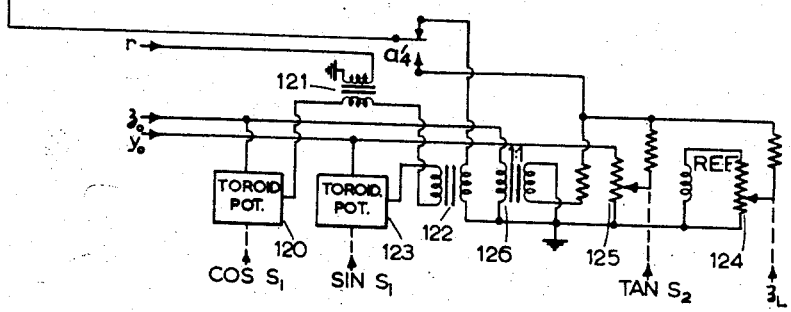
Figure 8B:
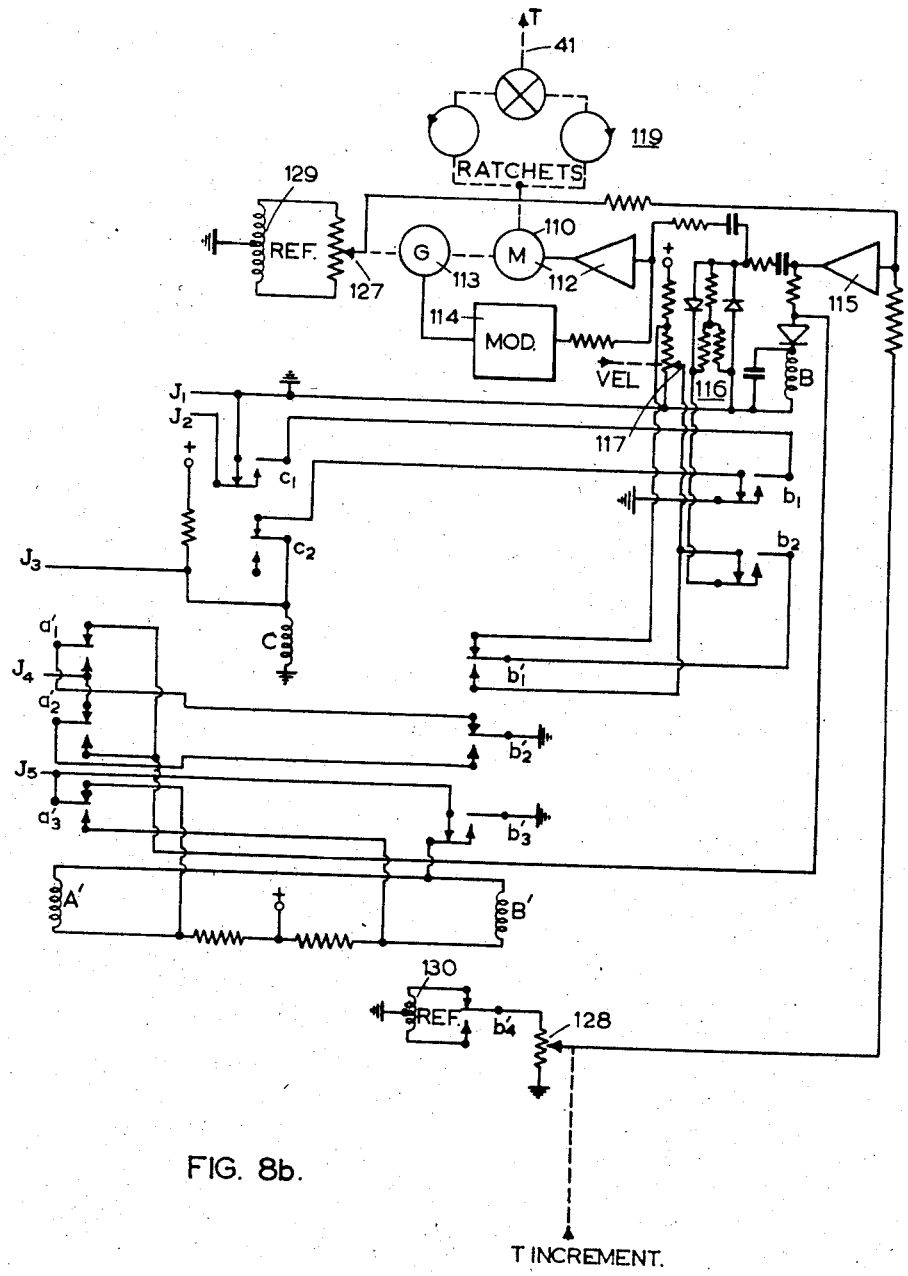

The sequence controller shown in Figure 8 comprises essentially two motors 110 and 111 which drive the T-shaft 41 and the z-shaft 66. The driving power for the motor 110 is imparted by a power amplifier 112 included in an anti-hunting feedback loop comprising a tacho-generator 113 and modulators 114 for modulating a reference alternating voltage (of the frequency used throughout the mechanism) with the output of the generator. The amplifier 112 includes a phase sensitive rectifier. The input to the power amplifier is derived from a high gain amplifier 115 and is applied across a two-way limiter of a known construction denoted in general by the reference 116. The limiter 116 determines the maximum velocity of the motor 110, which maximum is preset by the potential divider 117. The power circuit for the motor 111 is similar, the input signal being derived from a high gain amplifier 118. Relay armatures A and B are coupled in the output circuits of the amplifiers 118 and 115, in series with rectifiers as shown so that the current in the armatures A and B has a single sense, independent of the polarity of alternating output signals of the respective amplifiers. The armature A operates relay switches $a_1$ and $a_2$, whereas the armature B operates relay switches $b_1$ and $b_2$. Other relay armatures A', B', and C operate relay switches $a_1'$ to $a_4'$, $b_1'$ to $b_4'$ and $c_1$, $c_2$ respectively. The A' and B' relays with the switches $a_3'$ and $b_3'$ form a bistable trigger circuit. In Figure 8 all the relay switches are shown released, that is in the conditions they assume when their armatures are deenergised.

Reverting to Figure 4, it can be shown that the plane 7 is defined by the equation $$z_0 \cos S_1 = r + y_0 \sin S_1$$

Similarly the plane 8 is defined by the equation $$z_0 = z_L + y_0 \tan S_2$$

The mode of operation of the sequence controller (starting from K, say) is to drive the z-shaft 66 at a preset speed, corresponding to a uniform rate of change of $z$, with the T-shaft stationary. While this is occurring $z_0 \cos S_1$ is compared with $r + y_0 \sin S_1$, and when equality is established, indicating the arrival of the z-servo at L, the A-relay is released which instigates the insertion of the next increment of T by the servo-motor 110, which drives the shaft 41 through a double ratchet device (which will be referred to subsequently). The servo-motor 110 runs to a new null position at a preset speed and releases the B-relay when the null is achieved at M. The release of the B-relay switches the servo-motor 111 to equate $z_0$ and $z_L + y_0 \tan S_2$, whereupon a similar half-cycle commences.

To achieve this mode of operation the signal $z_0$ from the lead 100 is multiplied by $\cos S_1$ by a toroidal-core potentiometer 120 the tap of which is manually set. The signal $r$ from the lead 101 is subtracted from $z_0 \cos S_1$ by means of the transformer 121 and the resultant is applied to one end of the primary winding of the transformer 122. A signal $y_0 \sin S_1$ generated by a manually-set toroidal-core potentiometer 123, energised by the signal $y_0$ from the lead 99, is applied to the other end of the primary winding of 122. The resultant voltage across the secondary winding of 122 is therefore $$z_0 \cos S_1 - r - y_0 \sin S_1$$

and it is applied to one contact of the switch $a_4'$. Moreover a signal $z_L$ derived from a potentiometer 124, is combined with a signal $y_0 \tan S_2$ generated across a potentiometer 125 and subtracted from $z_0$ by virtue of the transformer 126 to form $z_0 - z_L - y_0 \tan S_2$. This resultant is applied to the other contact of switch $a_4'$. The same accuracy is not required in forming this resultant so resistive potentiometers may be used instead of toroidal-core potentiometers.

To explain the operation of the sequence controller in greater detail it will be assumed that a point just before L (Figure 4) has been reached, and that A is energised but all other relays are off.

At L, A releases because the input to the amplifier 118 virtually becomes zero, passing an earth pulse P (Figure 9) via $a_1$ and $c_1$, to the bistable circuit comprising relays A' and B' with contacts $a_3'$ and $b_3'$. B' is energised via $b_3'$, locks on, and reverses the null of the T-servo motor 110 via $b_4'$. This action energises B which excites C via $b_1$ and $c_2$ by breaking the short circuit across C. When the null on the servo-motor 110 is reversed by $b_4'$ the servo rotates the T-shaft 41 through one ratchet in the device 119 until the voltage at the tap of a potentiometer 127 is equal and opposite to the voltage at the tap on the potentiometer 128. This inserts the T-increment. The tap of potentiometer 127 is driven by the motor 110 while the tap of potentiometer 128 is preset to determine the T-increment. The windings 129 and 130 are secondary windings of transformers by means of which reference voltage is injected across the potentiometers.

Figure 9:
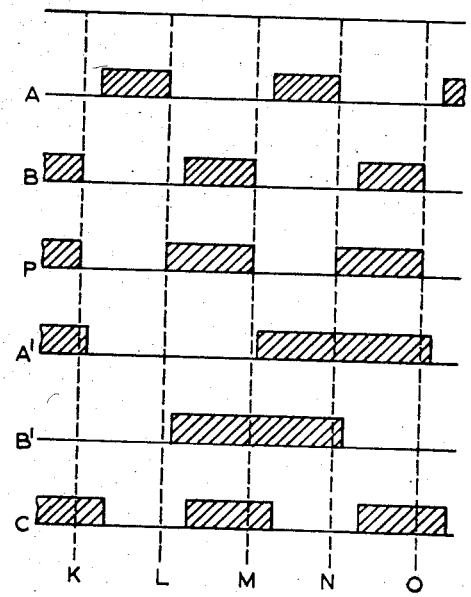
Figure 9 is a timing diagram relative to Figure 8.

The voltages at the taps on 127 and 128 become equal and opposite at M, when the input to the amplifier 115 vanishes. Therefore at M, B releases, ending the earth pulse P, via $b_1$, $c_1$ and $a_1$, which energises A' via $b_3'$ reversing the null of the z-servo motor 111 via $a_4'$ and applying $z_0 - z_L - y_0 \tan S_2$ to the amplifier 118. This action also energises A which unlocks C via $a_2$. B' remains energised during the stage as shown in Figure 9.

The input to the amplifier 118 becomes zero at N, and A releases, passing an earth pulse P via $a_1$ and $c_1$ to release B' via $a_3'$, reversing the null of the T servo via $b_4'$. The servo motor 110 is therefore driven backward by an amount corresponding to the increment T and this drive is transmitted by the other ratchet of the device 119 and by reversing gearing to the shaft 41, thereby inserting a further T increment. (The device 119 therefore corresponds to a mechanical rectifier.) This action energises B which excites C via $b_1$ and $c_2$.

At O, B releases, ending the earth pulse P via $b_1$, $c_1$, and $a_1$ which releases A' (since the previous earth via $b_3'$ is now disconnected) reversing the null of the z servo motor 111 via $a_4'$, so that the signal $z_0 \cos S_1 - r - y_0 \sin S_1$ is applied to the amplifier 118. This action energises A which unlocks C via $a_2$. Just after O, A comes on and all other relays are released thereby completing the cycle.

The switches $a_1'$, $a_2'$ and $b_2'$ are arranged so that any large errors appearing in the otherwise nulled servos cannot prematurely excite the appropriate relay A or B. The contacts $b_2$ and $b_1$ are arranged so that the non-cutting part of the cycle, from N to O, is traversed at full speed.

It will be seen that the machine must be programmed to retrace T at the end of the scan so as to finish-off the route and return the tool to the original position.

The efficiency of the control programme could be improved by causing the tool, when cutting along the root from L to M, in Figure 4, to overshoot to P and then return at full speed to M before resuming the previous route. Such a cycle has the advantage that the non-cutting sections of the path are traversed in the shortest possible time. The velocity and incremental T may be programmed on the record, and in that event such a manoeuvre would require the T-increment reader to look ahead to the next value during the overswing and to adjust the velocity and excursion of the T servo appropriately. In such a version of the sequence controller it may be found convenient to replace some relays by an impulse-driven multi-way switch such as a uniselector.

The computation required to determine $z_L$ for any given $r$ could be avoided by setting-up $z_0 \cos S_2$ and $y_0 \sin S_2$ separately on resistive potentiometers and injecting the sum of these together with $r$ and a constant into the z-servo system over the appropriate ranges.

The servos employed in control mechanism according to the invention would in practice have automatic gain control to ensure that, in known manner, each servo is uniformly "stiff," and that the sensitivity is not a function of angle.

It is preferred in control mechanism according to the invention to employ parametric interpolation of both co-ordinates round the sections, as in the control mechanism described. In this method, twist information as well as camber can be included in the basic information on the sections provided by the reference points, since both co-ordinates of the critical points appear at corresponding entries in the record associated with each section, and those co-ordinates are interpolated individually. A critical point at any intermediate station is obtained by interpolation between critical points on reference stations, rather than between points on each side of critical. Thus, a knife edge can be maintained along the length of the blade.

It is, however, also possible, according to the invention to use "single" interpolation round the sections, that is to interpolate one co-ordinate as a function of the other co-ordinate (the third co-ordinate being stationary at a section). As a closed loop is involved, this would necessarily involve polar co-ordinates, with radius recorded as a function of angle, which would be practicable with a fairly large diameter cutter in spite of one concave surface.

If the recording of the sections includes their orientation, then interpolation along the blade includes, effectively, interpolation round the section, and the spacing between sections must correspond to the spacing of ordinates round an individual section. For instance, if a section required ordinates to be recorded at 5 degree intervals, and the total twist of the blade were 50 degrees, ten sections would have to be instrumental even if the sections were almost identical.

An alternative is to extract the twist angle to be instrumented as a separate parameter, and to instrument the sections as though they were stacked substantially without twist. This obviates some of the difficulty of the last paragraph and in favourable circumstances will reduce the number of sections needed to three or four.

The restriction on the fairly simple approach of the last paragraph arises from the varying curvature or camber of the successive sections. Because of this varying camber the critical points, such as leading and trailing edges, of various sections are not all brought back to the same angular positions by extracting the twist feature. Interpolation along the length is at least partially an interpolation round such critical points.

In the control mechanism shown, each interpolation is quadratic, but it will be understood that higher order interpolation may be used if necessary and, equally, linear interpolation may suffice in some cases, for some co-ordinates if not others. Moreover additional facilities may be required for machining the junction between a blade and route, and an external shroud where such is required. It is also possible to vary the attitude of the cutter in some predetermined manner during cutting, by programming the angle $S_1$ and employing signals derived from the record to vary $S_1$ in the desired manner and also vary the attitude of the cutter.

In some cases reduced accuracy may be tolerated in the parts of the mechanism which serve to take account of the dimensions of the cutter, compared with the parts of the mechanism (principally the interpolators) which serve to generate the basic signals, by employing the first mentioned means only to take account of dimensional errors of the cutter, that is departure in the dimensions of the actual cutter used from nominal dimensions employed in evaluating reference points.

The invention may of course be used for generating arbitrary three dimensional profiles, other than turbine or impeller blades. For example, it may be employed to profile aeroplane wing surfaces.

What we claim is:

1. Computing mechanism suitable for generating signals for controlling displacement of one part relative to another, comprising a source of signals representing three co-ordinates of a point which describes a locus on a three dimensional surface, means for deriving the direction ratios of the normal to the surface at said point, and manually presettable means responsive to said signals and said direction ratios for deriving control signals representing three co-ordinates of another point which describes the locus of a centre of a rolling body having a point of contact with said surface which constitutes said first mentioned point.

2. Computing mechanism suitable for generating signals for controlling relative displacement of one part relative to another, comprising a source of signals representing three co-ordinates of a variable point whose position relative to the origin of the co-ordinate system is denoted by vector P, means for deriving from said signals the direction ratios of a unit vector $n$ from said variable point and normal to the surface described by said variable point, means for setting up direction ratios of a vector $c$, means for setting up a signal representing the magnitude of a first radius R, means for setting up a signal representing the magnitude of a second radius $r$, means for solving the vector equation $C=P+rn+RR$ where R is a unit vector whose direction is determined by the first condition that the scalar product $R.c=0$, and by the second condition that the scalar product $R.(n \times c)=0$, where $n \times c$ is the vector product of $n$ and $c$.

3. Mechanism according to claim 2, said means for deriving the direction ratios of the vector $n$ comprising means responsive to the signals representing the co-ordinates of said variable point for deriving the differentials of the surface described by said point.

4. Mechanism according to claim 2, wherein said means for solving the vector equation comprising means responsive to the direction ratios of the vector $n$ for generating signals representing the co-ordinates of the vector $rn$ and for adding these signals to the signals representing the co-ordinates of said variable point.

5. Mechanism according to claim 2, wherein said means for solving the vector equation comprises means responsive to the direction ratios of the vector $c$ and the vector $n$ for deriving the direction ratios of the vector R, means responsive to the direction ratios of the vector R for generating signals representing the co-ordinates of the vector RR, and means for adding these signals to the signals representing the co-ordinates of said variable point.

6. Mechanism according to claim 2, said source of signals representing three co-ordinates of a variable point comprising first interpolating means for interpolating round spaced plane sections in response to signals representing reference points which determine said sections, and further interpolating means for interpolating within the output of said first interpolating means, and said means for deriving signals representing the direction ratios of said vector $n$ comprising means for deriving, in response to said first interpolating means, first signals representing differentials of the surface described by said variable point, in the planes of said sections, means for interpolating within said first signals representing differentials for deriving second signals representing differentials of said surface in parallel planes between said sections, and means for deriving third signals representing differentials in planes perpendicular to said sections in response to said further interpolating means.

References Cited in the file of this patent

UNITED STATES PATENTS

| 2,537,427 | Seid et al. | Jan. 9, 1951 |
| 2,628,539 | Neergaard | Feb. 17, 1953 |
| 2,685,054 | Brewer et al. | July 27, 1954 |

OTHER REFERENCES

Report entitled "A Numerically Controlled Milling Machine," published by Servomechanisms Laboratory, M.I.T., May 31, 1953.

Notice of Adverse Decision in Interference

In Interference No. 90,747 involving Patent No. 2,883,110, R. E. Spencer and R. Voles, Computing mechanism especially for controlling automatic machine tools, final judgment adverse to the patentees was rendered May 8, 1962, as to claim 1.

[*Official Gazette June 26, 1962.*]